US012054367B2

(12) United States Patent
Zerza et al.

(10) Patent No.: US 12,054,367 B2
(45) Date of Patent: Aug. 6, 2024

(54) CABLE DRUM FOR A CABLE WINCH, AND CABLE DRIVE HAVING SUCH A CABLE DRUM

(71) Applicant: Liebherr-Components Biberach GmbH, Biberach an der Riss (DE)

(72) Inventors: Horst Zerza, Biberach an der Riss (DE); Ilaka Mupende, Neu-Ulm (DE)

(73) Assignee: Liebherr-Components Biberach GmbH, Biberach an der Riss (DE)

(*) Notice: Subject to any disclaimer, the term of this patent is extended or adjusted under 35 U.S.C. 154(b) by 300 days.

(21) Appl. No.: 17/651,684

(22) Filed: Feb. 18, 2022

(65) Prior Publication Data

US 2022/0267122 A1 Aug. 25, 2022

Related U.S. Application Data

(63) Continuation of application No. PCT/EP2020/072531, filed on Aug. 11, 2020.

(30) Foreign Application Priority Data

Aug. 19, 2019 (DE) ..................... 10 2019 122 143.9

(51) Int. Cl.
*B66D 1/30* (2006.01)
*B66D 1/38* (2006.01)

(52) U.S. Cl.
CPC ..................................... *B66D 1/38* (2013.01)

(58) Field of Classification Search
CPC .......... B65H 75/241; B66D 1/38; B66D 1/30; B66D 2700/0183
See application file for complete search history.

(56) References Cited

U.S. PATENT DOCUMENTS

| | | | | | |
|---|---|---|---|---|---|
| 3,266,748 | A * | 8/1966 | Bus, Sr. | B66D 1/30 242/578 |
| 3,840,198 | A * | 10/1974 | Moore | B65H 75/241 242/578.3 |
| 2004/0245362 | A1 | 12/2004 | Ast et al. | |
| 2007/0138333 | A1 | 6/2007 | Ziemek et al. | |
| 2015/0284223 | A1 | 10/2015 | Hall et al. | |

FOREIGN PATENT DOCUMENTS

| | | |
|---|---|---|
| AT | 310512 | 10/1973 |
| CN | 104609305 | 5/2015 |
| CN | 206940111 U | 1/2018 |
| CN | 109502428 | 3/2019 |
| DE | 2944715 | 5/1981 |
| FR | 2044128 | 2/1971 |
| WO | WO 2021/032540 | 2/2021 |

* cited by examiner

*Primary Examiner* — Emmanuel M Marcelo
(74) *Attorney, Agent, or Firm* — Levine Bagade Han LLP

(57) ABSTRACT

The invention relates to a cable drum for a cable winch of a cable drive, having a drum body and two guard plates which surround the drum body on the face sides and delimit a winding space therebetween, wherein at least one of the guard plates has at least one inner wall part which is adjustable axially in the direction of the drum longitudinal axis such that the distance between the guard plates is adjustable.

21 Claims, 5 Drawing Sheets

CABLE DRUM FOR A CABLE WINCH, AND CABLE DRIVE HAVING SUCH A CABLE DRUM

CROSS-REFERENCE TO RELATED APPLICATIONS

This application is a continuation of International Patent Application Number PCT/EP2020/072531 filed Aug. 11, 2020, which claims priority to German Patent Application Number DE 10 2019 122 143.9 filed Aug. 19, 2019, the contents of which are incorporated herein by reference in their entireties.

BACKGROUND

The present invention relates generally to rope drives working with high-strength fiber ropes and steel cables such as crane hoists, boom adjustment gear, trolley traveling gear, and the like. The invention here in particular relates to a hoist drum for the cable winch of such a cable drive comprising a drum body for winding up the cable, and two guard plates surrounding the drum body on the face sides.

Cable winches are used in various application areas and substantially comprise three main assemblies, namely, on the one hand, the hoist drum having a drum jacket and end plates or guard plates attached to the face sides and limiting the drum jacket; on the other hand, a drive transmission; and finally a winch frame at which the hoist drum is rotatably supported. Said drive transmission is here frequently accommodated in the interior of the hoist drum and can, for example, be formed as a single-stage or multi-stage planetary gear.

Such cable winches are used, for example, for lifting equipment in machine construction and plant construction or in transfer engineering, with the cable winches being able to serve for vertical material transport, but also as a horizontal feed drive or a slopingly inclined feed drive. The cable winches can in this respect in particular be installed on cranes such as construction cranes, mobile cranes, or maritime cranes such as harbor cranes, ship cranes, and offshore cranes, with the hosting winches here being able to be cable winches for winding and unwinding a hoist cable, but also guying winches for guying ropes, or feed winches, for example for traveling a trolley. Such cable winches are furthermore likewise used for other construction machinery such as crawler-mounted cranes or as derrick winches or other maritime applications such as deep sea winches. Such winches are also used in aeronautics, for example as hoist or load winches on helicopters or airships.

One problem with such cable winches is the winding pattern on the drum, especially when the drum is wound in multiple layers, and the cutting in of the cable between two turns of the winding layer below.

In order to achieve a good winding progression image, the drum body can be provided with a grooving, wherein the pitch and the cable diameter are adapted to each other clearance free as possible in order to guide the cable turns next to each other with as little clearance as possible. However, especially in the case of larger drum widths with many cable turns, for example 30 or 40 or even more turns next to each other and/or with multiple layers of turns on the drum, for example six or eight or ten or even more layers on top of each other, the winding progression image can still be impaired and the problem of cutting in mentioned above can occur.

On the one hand, possible clearance of the pitch can add up to the cable diameter and result in a gap in which the cable can cut into the lower winding layers, which leads to disturbances of the winding progression image. Such disturbances occur in particular from the fifth or sixth winding layer onwards, when there is too much clearance between the pitch and the cable diameter.

On the other hand, such winding image errors can also result from the fact that the diameter of the cable to be wound is not constant. On the one hand, such deviations in cable diameter can be due to production and include diameter variations over the cable length. However, the cable diameter can also change over the cable service life, and cable diameter reduction can occur over time, especially due to cable operation, which also leads to disturbances in the winding progression image.

In the case of cable drums with a multi-layer storage capacity of, for example, approx. 4 to 10 layers, after a certain period of use, the reduction in cable diameter results in accumulation of clearance in the cable winding, which consequently leads to cutting in of the cable in the underlying cable layers and thus also to cable damage, which must be avoided. Avoidance would in itself be possible by choosing a new cable even if the old one is not yet ready to be discarded, but this would lead to wasting the cable lifetime.

But even new cables can have deviations from the nominal diameter.

Such changes in cable diameter, whether due to manufacturing tolerances or in the course of over time due to cable operation, occur more frequently with high-strength fiber ropes, which generally exhibit greater diameter deviations than steel cables.

For quite some time now attempts have been made in the lifting technology and in particular in cranes to replace the commonly used heavy steel ropes by high-strength fiber ropes which are made of high-strength synthetic fibers such as for example aramide fibers, aramide/carbon fiber mixtures, highly modular polyethylene fibers (HMPE), liquid crystal polymer (LCP)-Vectran or poly(p-phenylene-2,6-benzobisoxazole) fibers (PBO) or at least include such fibers. Thanks to the weight saving in regard to the steel cables, the lifting capacity or the admissible hoisting load can be increased, since the self-weight of the cable to be taken into consideration for the lifting capacity is lower. Particularly in the case of cranes with a large lifting height, or in boom or mast adjustment gears using pulley blocks of a high reeve count, considerable cable lengths and thus also a corresponding cable weight occur, so that weight reduction possible through high-strength fiber ropes is very advantageous. In addition to the weight advantage of the fiber rope itself, there is the additional fact that the use of fiber ropes also enables a weight saving in further components. For example, the lifting hook can be made lighter since less lifting hook weight is needed for the rope tensioning of a fiber rope. On the other hand, the good flexibility of synthetic fiber ropes allows smaller bending radii and hence smaller pulleys or rollers on the crane, which leads to a further weight reduction in particular in the area of crane booms, so that with large crane outreaches a considerable increase in load moment can be achieved. In addition to the named weight advantages, fiber rope drives are characterized by a larger service life, easier handling, and good flexibility as well as the no longer required rope lubrication.

On the other hand, such fiber ropes are more difficult to wind cleanly, especially because the diameter of fiber ropes varies more than that of steel cables.

The above-mentioned problem of the cable to be wound cutting in between two cable sections of the underlying winding layer can be aggravated even further if strongly varying cable tensile forces act during winding of the cable, as can occur in particular with hoisting gear cable drives. For example, the load hooks of cranes such as revolving tower cranes or telescopic jib cranes are often lifted load-free, or more precisely without a load attached, in order to pick up a load at a greater height, which is then lifted or lowered even higher if necessary. Due to the fact that the cable is initially wound up without load or with only very low cable tension, it is not wound up tightly layer by layer, so that when the cable tension increases significantly due to a load being applied to the load hook, the cable can cut into the loosely wound winding layers below.

DE 29 44 715 A1 shows a drum system which makes it possible to convert the drum to a smaller flange distance or to a smaller drum diameter for different cable diameters and cable storage possibilities, suitable for drum use on research vessels where a simple and fast conversion of the cable drum should be possible. However, such a conversion does not allow fine adjustment of the guard plates spacing to a cable diameter that decreases, e.g. due to aging, and is also not feasible when the cable is on the drum.

DD 1 27 667 A1 shows a split, displacable guard plate, but the task of fine adjustment of the guard plate spacing is also not given. Here, the drum is a non-grooved drum on which two cables, left and right, can be wound but this is only permissible up to a 2-layer operation. The displacable pulley is split for assembly reasons and can be fixed in the required position by means of a clamping system. The split pulley serves as a limitation of the winding length on the drum. Readjustment or fixing is then no longer possible when the drum is wound. Fixing the split pulley is to be classified as very weak because of the known very high horizontal loads acting on the pulley.

SUMMARY

It is the underlying object of the present invention to provide an improved cable drum for a cable winch of a cable drive as well as a cable drive having such a cable drum to avoid the disadvantages of the prior art and to further develop the latter in an advantageous manner. In particular, an adequate winding progression image is to be achieved even with multi-layer winding despite a possibly changing cable diameter, and cutting of the cable into the underlying winding layers is to be avoided even under unfavorable winding conditions.

In accordance with the invention, said object is achieved by a cable drum in accordance with claim 1, by a cable winch in accordance with claim 20, and by a cable drive in accordance with claim 21. Preferred embodiments of the invention are the subject-matter of the dependent claims.

It is therefore proposed to variably adjust the side support of the cable winding at the cable contact surfaces of the guard plates to the possibly changing cable diameter or changes in the width of a winding layer occurring for other reasons, in order to achieve reliable side support of the cable winding and a compact winding progression image. According to the invention, at least one of the guard plates has at least one inner wall part which can be adjusted axially in the direction of the longitudinal axis of the drum and by means of which the distance between the two guard plate can be adjusted. If, for example, the cable diameter of the cable to be wound gradually decreases so that, with a given number of turns in a winding layer, there is clearance between the cable turns or, viewed as a whole, the width of the winding layer no longer corresponds to the spacing of the guard plates provided per se, so that the guard plates would no longer provide sufficient lateral support for the winding layer per se, the said inner wall part of the at least one guard plate can be adjusted axially inwards towards the other guard plate in order to adapt the distance between the guard plates to the actual winding layer width caused by the cable diameter and to achieve sufficient lateral support of the cable winding by the guard plates. Vice versa, the inner wall part can be adjusted outwards away from the other guard plate to increase the guard plate spacing again when using an oversize diameter cable or replacing an old fiber rope that had decreased in diameter with a new one that has returned to its original diameter.

With the adjustment of the flanges, it is possible to maintain an almost clearance-free winding of the cable in case of changing cable diameters, regardless of whether this is due to aging or manufacturing tolerances of the cable. It may be sufficient to have an adjustment path of 50% of the cable diameter to compensate for changing cable diameters, although larger or smaller adjustment paths may also be provided.

Advantageously, the guard plate spacing can be adjusted very finely in order to be able to adapt the spacing precisely to changes in cable diameter as they occur. In particular, the adjustment device for adjusting the guard plate can enable stepless adjustment of the distance between the guard plates. Advantageously, said inner wall part of at least one guard plate can be configured to be continuously axially adjustable and thus the distance between the guard plates can be continuously adjusted.

In an advantageous further development of the invention, the adjustment mechanism is configured to adjust the inner wall of the guard plate and/or the guard plate spacing when the cable drum is wound. Such an in-situ adjustment with spooled drum allows a very exact compensation of cable diameter changes.

In further development of the invention, the adjustable inner wall part can form an adjustment ring which can form a ring section of the cable contact surface of the guard plate or also the entire cable contact surface of the guard plate and can be mounted so as to be axially adjustable in the direction of the longitudinal direction of the drum relative to a fixed guard plate part and/or to a drum body part.

Said adjustment ring or, in general, the adjustable inner wall part may advantageously extend over several cable layers and/or have a height corresponding to at least an integer multiple of the cable diameter and/or laterally support several winding layers.

For example, said adjustment ring may have an inner diameter larger than an outer shell diameter of the drum jacket body. Regardless, an outer diameter of the adjustment ring may be greater than the diameter of an envelope cylinder around an at least three-ply or five-ply or eight-ply cable winding wounded around the drum.

Advantageously, the adjustment ring forms a rope contact surface for at least two superimposed cable winding layers, wherein the adjustment rings can also laterally support three or five or eight or more winding layers.

In further development of the invention, said adjustable inner wall part, in particular when configured in the form of an adjustment ring, can be guided axially displaceably by a rail guide to permit preferably stepless axial adjustment of the inner lateral surface onto and away from the opposite guard plate. For example, said rail guide may comprise a pin guide in which guide holes may also slide axially extending guide pins, wherein the guide pins may be provided on the fixed guard plate portion and/or on a displaceable guard plate portion and said guide holes may also be provided inversely on the displaceable guard plate portion and/or on the fixed guard plate portion. Alternatively or additionally, however, the rail guide can also have, for example, a preferably cylindrically extending guide shoulder on the drum body and/or on a stationary guard plate part, on which the guide arm the adjustment ring or otherwise shaped portion of the inner wall may slide axially and is thus radially supported.

In an advantageous further development of the invention, the adjustable inner wall part, in particular said adjustment ring, can be provided with a pretensioning device for elastically pretensioning the adjustable inner wall part towards the opposite guard plate. Said preloading device thus advantageously pushes the adjustable inner wall part inward to try to reduce the distance between the guard plates. Said pretensioning force provides lateral support for a cable layer wound between the guard plates, while at the same time compensating for a changing cable diameter or a changing winding layer width due to other reasons, such as varying cable tensile forces.

The guard plate or its adjustable inner wall part can therefore operate in a self-adjusting manner and adapt automatically to changes in the cable diameter or the winding layer width.

The pretensioning force provided by the pretensioning device can be fixed and/or constant over the adjustment path. Alternatively or additionally, however, the pretensioning device can also have an operating mode in which the pretensioning force can be controlled or adjusted.

For example, the pretensioning device may comprise one or more spring devices, for example in the form of a mechanical spring device, wherein adjustment means, for example in the form of an adjustable spring stop, may change the pretensioning force of the spring device.

Alternatively or additionally, a hydraulically or pneumatically operating pretensioning device or a pretensioning device adjustable by an adjusting spindle can be provided, the pretensioning force of which can be changed by adjusting the hydraulic or pneumatic pressure or by adjusting the spindle.

Alternatively or in addition to said pretensioning device, in further development of the invention, an adjustable path limiter may be provided for variably setting an axial travel limit for the adjustability of said inner wall part. Such a adjustable path limiter can, in particular, have a stop that specifies or limits a maximum position of the movable inner wall part away from the opposite guard plate. Alternatively or additionally, the adjustment path limitation can also be set in both axial directions, so that a maximum position of the inner wall part away from the opposite guard plate and a maximum position of the inner wall part close to the opposite guard plate are specified.

The said stop can be configured to be adjustable in order to be able to variably set the said positions.

In an advantageous further development of the invention, the adjustable travel limiter can also variably adjust the length of the travel, wherein the adjustment path limiter can, if necessary, also completely block an adjustment path and firmly specify a desired axial position of the inner wall part or hold the inner wall part in an axial position.

If said adjustment path limiter is used in combination with said pretensioning device, the guard plate or its adjustable inner wall part can move in the path range limited by the adjustment path limiter while overcoming the pretensioning force of the pretensioning device.

As an alternative or in addition to such a guard plate with elastic pretensioning, however, a guard plate—possibly opposite—with an adjustable inner wall part can also be provided, the position of which is variable but can be preset in a fixed manner in each case.

In further development of the invention, at least one guard plate can also have several, preferably individually adjustable inner wall parts, so that in different segments or sections of the guard plate its inner wall can be axially adjustable to different extents. This provides even more adjustment possibilities, allowing finer, partially different adaptation of the lateral support forces to various irregularities in the winding progression image.

The multiple, individually axially adjustable inner wall parts can be arranged at different radial distances from the drum body to give different winding layers axially differently positioned cable contact surfaces. Alternatively or additionally, the adjustable inner wall parts can also be spaced apart or arranged one behind the other in different circumferential sectors or in the circumferential direction, in order to be able to adapt the cable contact surface in a winding position to the cable course contour, in particular in the contact area. If the cable is wound helically around the drum body in accordance with the groove pitch, the cable starts at a slight angle at a starting point on the guard plate and then follows the circumferential contour over a certain angular range before finally coming off the guard plate again at an acute angle and running towards the opposite guard plate. In said sharp angle winding and unwinding sectors, it can be useful to give the guard plate contour or the inner wall surface a pitch in the circumferential direction or an offset in the circumferential direction in order to provide the best possible support for the cable. This can be achieved by means of inner wall parts which are spaced apart or arranged one behind the other in the circumferential direction and can be adjusted axially in different ways.

In further embodiments of the invention, multiple adjustment rings of different diameters can form adjustable inner wall parts. For example, the guard plate can comprise two, three, five or even more adjustment rings, which are arranged coaxially and, viewed in the radial direction, are directly adjacent to one another, but may also be spaced apart from one another.

Each of said adjustment rings can extend in the radial direction over one, two, three or even more winding layers or form a rope contact surface for two, three, five or even more winding layers.

In an advantageous further development of the invention, the said adjustment rings can be connected at their parting lines or transition points by a thread to a respective adjacent guard plate ring. In particular, several adjustment rings can be screwed together, wherein an adjustment ring located further to the outside can have a thread on its inner circumference which can be in screw engagement with a thread provided on the outer circumference of a ring located further to the inside. This allows the adjustment rings to be axially adjusted relative to each other by rotation.

Alternatively, however, said adjustment rings can also be axially displaceably guided and/or screwed to a fixed guard plate part, which fixed guard plate part can extend, for example, along an outer wall facing away from the cable winding area. For example, the adjustment rings can be screwed to such a fixed flanged disc part via a screw thread extending coaxially to the respective adjustment ring in order to be able to generate an axial adjustment by turning the adjustment ring. Alternatively, however, the adjustment rings can also be guided for axial displacement on the fixed guard plate part via a rail guide, for example in the form of axial guide pins and guide holes threaded onto them. The axial position of the adjustment rings can be set via adjusting actuators, for example in the form of adjusting screws, wherein said adjusting actuators can be supported on the stationary guard plate part.

If necessary, a pretensioning device, for example comprising at least one spring device, can also be provided in the design with several adjustment rings, which applies a pretensioning force to the adjustment rings or at least one of the adjustment rings, which pretensions the adjustment rings towards the opposite guard plate.

Alternatively or in addition to said adjustment rings, axially adjustable inner wall parts in the form of push elements can also be provided, having a push head that can be pressed against an adjacent cable and can be extended out of a surrounding guard plate part.

For example, said push elements may be screw bolts or may comprise screw bolts as actuators capable of axially displacing said push head, wherein said push head may be integrally formed from the front end of the screw bolt or may be formed as a separate push head capable of being axially displaced by the screw bolt or other actuator.

In an advantageous further development, the head of the push element can be made of a different material, in particular a softer material, than the adjusting body, in particular the screw body of the push element. For example, the push head can be made of plastic and the screw bolt body can be made of metal in order to gently apply pressure to the cable on the one hand and to stably absorb the positioning forces on the other.

To prevent unintentional adjustment of the push elements, a locking device can be assigned to the push elements to prevent axial adjustment and, in particular, to block rotation of the push elements. Such a locking device can, for example, be a lock nut, possibly with a locking plate, or a clamping screw that tightens the screw thread of the screw bolt.

Said push elements can be arranged in different patterns or different grids distributed over the inner wall of a guard plate. For example, a first group of push elements can be arranged along a pitch circle or along a circular path around the drum axis on the guard plate, wherein the push elements can be spaced equidistantly from one another in the circumferential direction or also arranged at non-uniform intervals.

Advantageously, at least one other group of push elements is distributed along another pitch circle that has a different diameter than the pitch circle of the first group of push elements. Advantageously, three, four, five or more groups of push elements can also be arranged distributed along a pitch circle in each case, which pitch circles have different diameters from one another in order to be able to axially support different winding layers with the respective groups of pressure pieces.

These pressure pieces can have a diameter that corresponds at least approximately to the cable diameter in order to be able to apply pressure to at least one winding layer. Advantageously, however, the push elements have a diameter which corresponds at least approximately to an integral multiple of the cable diameter, in order to be able to apply several winding layers simultaneously with one push element. For example, a push element can form a cable contact surface for two, three, four or five or even more winding layers.

In further development of the invention, at least five or at least ten or at least 15 or more than 20 push elements may be distributed along a pitch circle.

Advantageously, the push elements arranged in different pitch circles can be offset relative to one another, in particular along a pattern that is twisted by half the angular distance between two adjacent push elements, so that the push elements of an outer pitch circle, viewed in the circumferential direction, are each arranged approximately centrally between the push elements of an adjacent, further inward pitch circle. This can prevent excessive weakening of the guard plate wall. At the same time, a uniformity of the cable support provided by the push elements can be achieved across the winding layers.

The cable drum can have a multi-layer storage capacity of, for example, 4 to 10 layers, although storage of fewer than 4 or even more than 10 layers can also be provided.

BRIEF DESCRIPTION OF THE DRAWINGS

The invention will be explained in more detail in the following with respect to preferred embodiments and to associated drawings. The drawings show.

DETAILED DESCRIPTION

Figure 1:
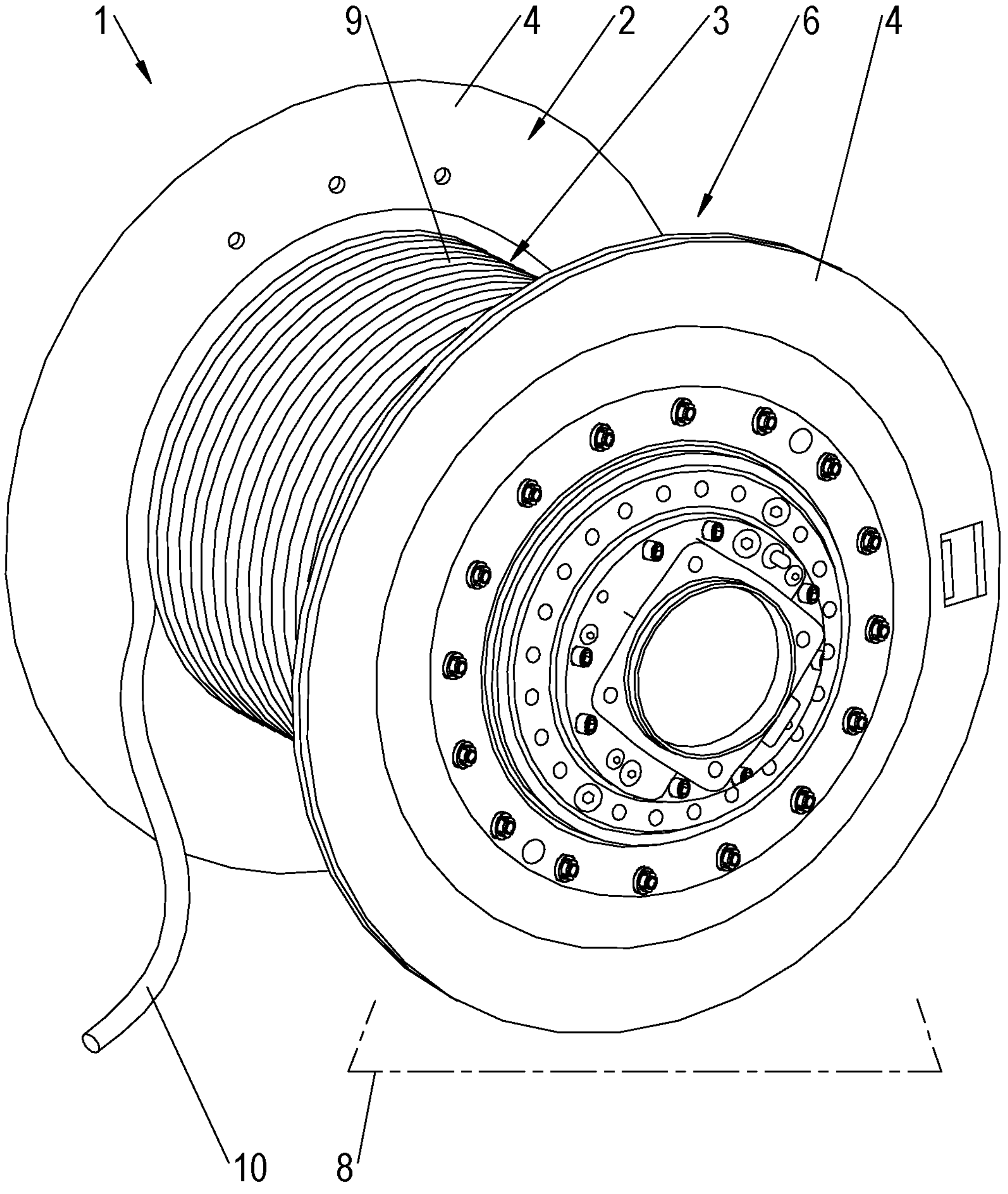
FIG. 1 shows a perspective view of a cable drum for the cable winch of a cable drive, which has a drum body provided with a groove and two guard plates provided at the ends.

As FIG. 1 shows, the cable winch 1 comprises a cable drum 2 having an at least approximately cylindrical drum body 3 and two guard plates 4 extending transversely to the longitudinal axis 5 of the drum body 3, adjoining said drum body 3 at the end face and projecting radially beyond the drum body 3 to laterally delimit the winding space 6 above the outer circumferential surfaces of the drum body 3 therebetween.

Said guard plates 4—at least a part thereof, as will be explained—may be rigidly attached to the drum body 3 at the end face, for example in a form-fitting and/or force-fitting manner, for example by means of screw bolts which may be screwed tightly through the guard plates 4 in the drum body 3 and pull the guard plates 4 against the drum body 3 at the end face.

Said cable drum 2 can be rotatably mounted on a winch frame 8, wherein, for example, the guard plates 4 can have bearing portions by means of which the cable drum 2 is rotatably mounted on the winch frame 8, for example by means of roller bearings.

To drive the cable drum 2, the cable winch 1 can have a drive gear that can be at least partially received in the interior of the cable drum 2 and/or can extend through one of the guard plates 4. A drive motor, for example in the form of a hydraulic or electric motor, can drive the drum body and thus the cable drum 2 in rotation via said drive gear.

Figure 2:
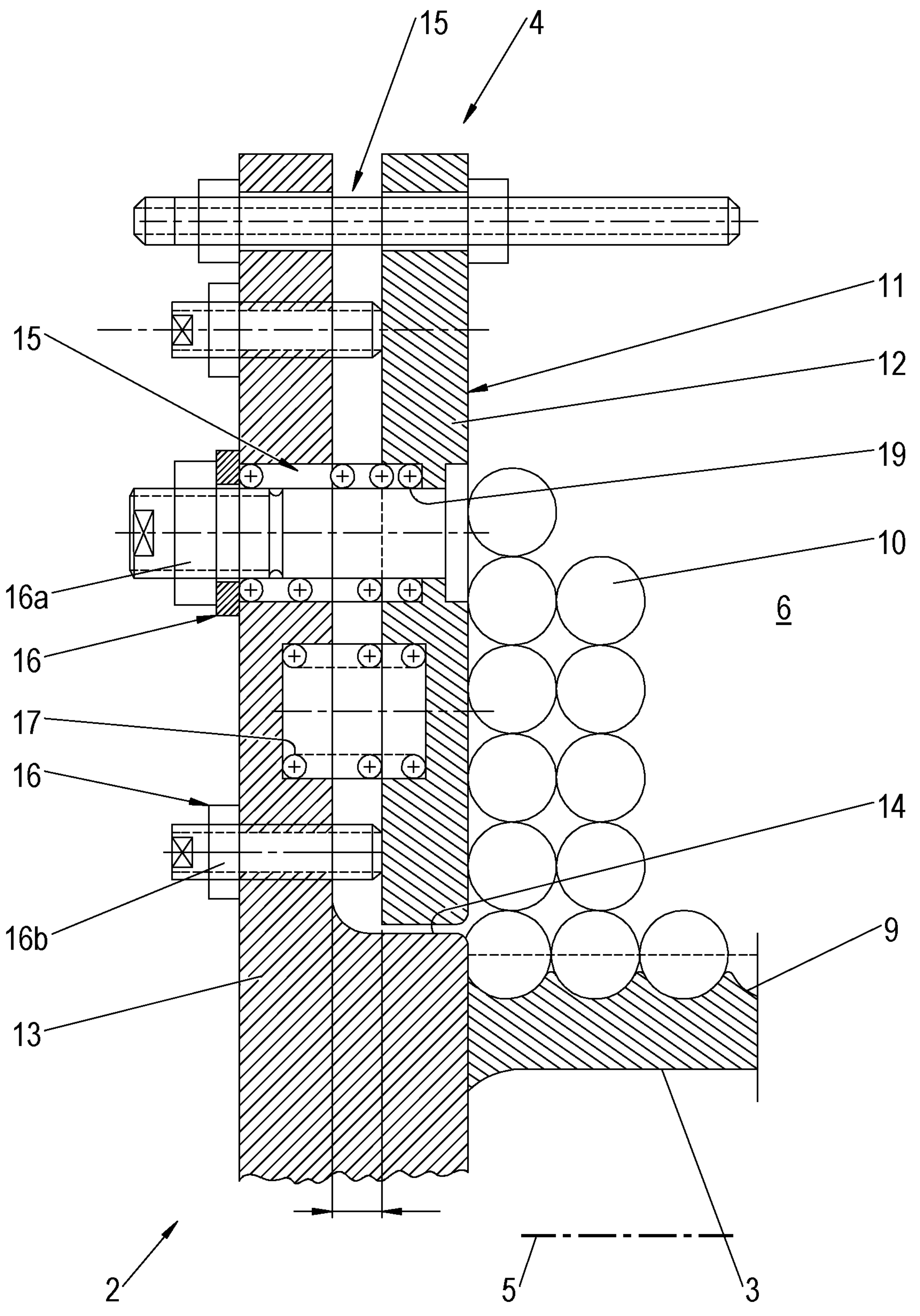
FIG. 2 shows a partial longitudinal section through the cable drum of FIG. 1, showing the adjustable inner wall part of a guard plate and the adjustable pretensioning device for pretensioning the adjustable inner wall part.

As FIG. 1 shows, the drum body 3 can be provided with a cable groove on its outer circumference, which can comprise helically extending cable grooves 9, which can be adapted to the diameter of the cable 10 to be wound up in order to fit closely against the cable 10 or to support it in the form of a shell, cf. FIG. 2.

As the figures show, at least one, preferably each, of the guard plates 4 comprises at least one axially adjustable inner wall part 11, which forms a cable contact surface for the cable 10 to be wound up and delimits the winding space 6. Said axially adjustable inner wall part 11 can thereby be adjusted at least approximately in the direction of the longitudinal axis 5, namely towards the opposite guard plate 5 or vice versa back or away from it, in order to be able to change the distance between the guard plates 4 and thus the width of the winding space 6.

As FIG. 2 shows, the axially adjustable inner wall portion 11 may include an adjustment ring 12 that may extend substantially the entire height of the guard plate 4. The adjustment ring 12 can form essentially the entire cable contact surface of the guard plate 4, wherein the cable contact surface for a lowest winding layer wound directly on the drum body 3 can be formed by a fixed guard plate part 13 and the cable contact surface for all further winding layers above it can be formed by said adjustment ring 12.

The adjustment ring 12 may form a substantially flat annular plate, the annular surface of which facing in the winding space 6 may be substantially flat and/or radially oriented. If necessary, it would also be possible to provide a slight slope so that the said cable contact surface of the adjustment ring 12 or the adjustment ring 12 as a whole can be slightly conical.

As FIG. 2 shows, the adjustment ring 12 can be guided axially displaceably on the fixed guard plate part 13, wherein said fixed guard plate part 13 can, for example, have a rail guide shoulder 14, for example in the form of an annular shoulder, on which guide shoulder 14 there is seated and displaceably guided the adjustment ring 12.

Alternatively or additionally, however, the adjustment ring 12 can also be guided axially displaceably on the fixed guard plate part 13 by means of another rail guide, for example by means of rail guide pins which extend parallel to the longitudinal axis 5 of the drum and are seated displaceably in rail guide holes in the adjustment ring 12 and/or the fixed guard plate part 13 and, if necessary, can also be fixed rigidly to one of the guard plate sliding segments.

Such rail guide pins 15 can also serve at the same time as a holding and/or clamping unit for mounting the cable drum 2, in particular for mounting the push springs which are yet to be described. However, the bolts 15 shown in FIG. 2 can also be removed during operation, in which case they need not form rail guide bolts, but can be simple screw bolts. Regardless thereof, the adjustment ring 12 can also be supported for axial displacement solely by the guide shoulder 14 shown.

Advantageously, however, adjustment path limiters 16 can also have rail guide pins, see FIG. 2, in order to guide the adjustable inner wall in an axially displaceable manner and to limit its displacement.

Advantageously, the adjustment ring 12 can be subjected to a pretensioning force by a pretensioning device 17, which tries to drive the adjustment ring 12 inwards, i.e. towards the opposite guard plate 4.

Such a pretensioning device 17 may, for example, include at least one spring device 18 which attempts to push the adjustment ring 12 away from the fixed guard plate part 13. The spring device 17 can be arranged between the adjustment ring 12 and the fixed guard plate part 13, for example accommodated in pockets formed therein.

The axial travel of adjustment path 12 may be limited by adjustment path limiters 16, said adjustment path limiters 16 being capable of limiting travel inwardly toward winding space 6 and/or limiting travel outwardly away from said winding space 6, wherein separate adjustment path limiters 16*a* and 16*b* may be provided to limit travel in both directions.

Advantageously, said adjustment path limiters 16 can be configured to be adjustable in order to variably preset the respective end position of the adjustable inner wall. Advantageously, the adjustment path limiters 16 can also be configured to reduce the travel to zero or to completely fix the adjustment ring 12 in a desired position.

As FIG. 2 shows, an adjustment path limiter 16*a* can limit the travel inwards, wherein the adjustment path limiter 16*a* can comprise a screw bolt which is fastened to the adjustment ring 12, for example screwed, or can also retain the adjustment ring 12 positively by a head only.

Said screw bolt of the adjustment path limiter 16 may pass through the fixed guard plate part 13 and be retained on the outer or rear side of the fixed guard plate part 13 by means of a nut 18. By adjusting the nut 18, the adjustment path can be variably set, as shown by the adjustment dimension y in FIG. 3. Alternatively or additionally, however, an adjustment of the adjustment path could also be varied by screwing on the adjustment ring 12 and/or in other ways, for example by means of clamping claws which can be fixed in different axial positions and which could replace the nut 18.

Figure 3:
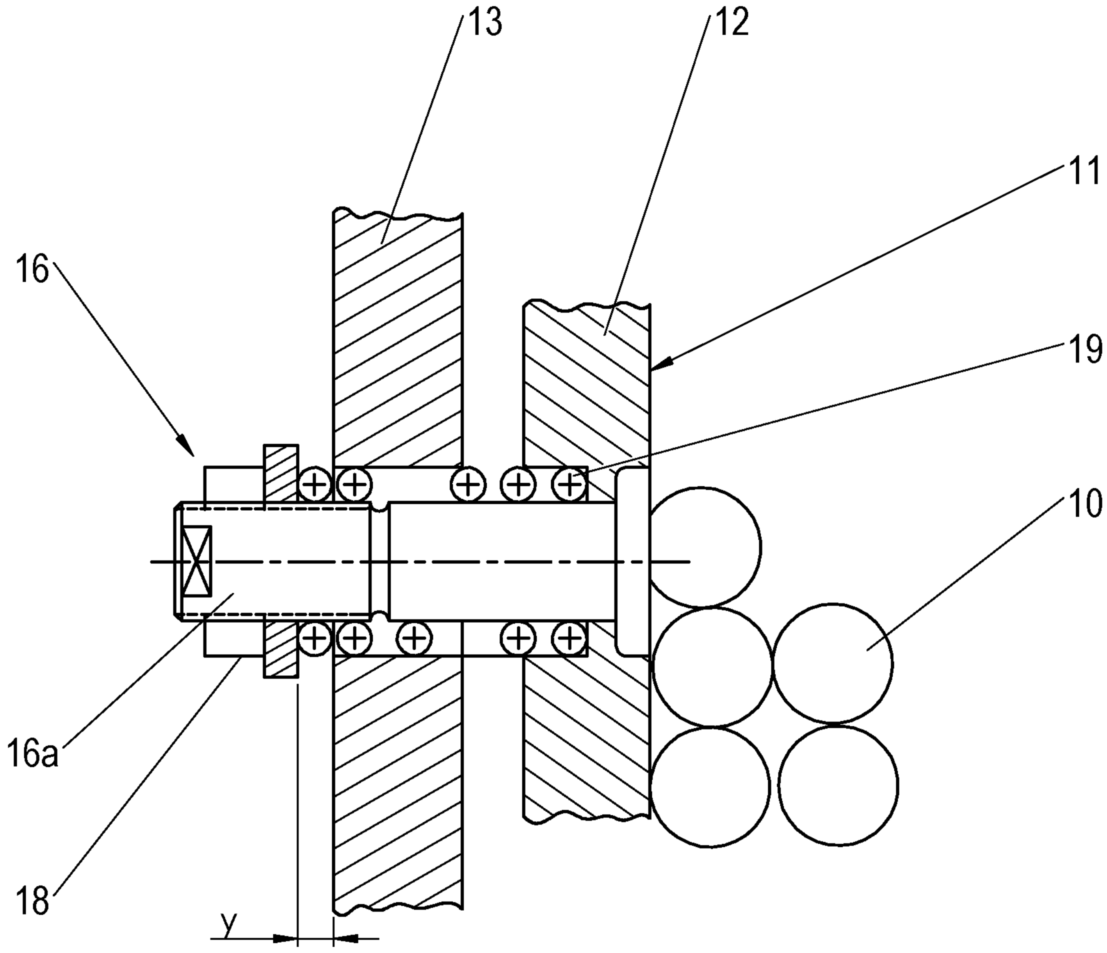
FIG. 3 shows an enlarged, sectional view of the adjustable pretensioning device for adjusting and pretensioning the inner wall part of the guard plate of FIG. 2.

As shown in FIGS. 2 and 3, a spring device 19 can be provided between the adjustment ring 12 and the nut 18 to fix the adjustment path limiter 16*a*, in particular its screw bolt, in a position in contact with the adjustment ring 12.

The position of the nut 18 shown in FIG. 2, resting against the outside of the guard plate part 13, limits the travel of the inner wall 11 inward toward the winding space 6, while FIG. 3 shows a spring-back position.

The adjustment travel outward away from the winding space 6 can be limited by one or more adjustment path limiters 16*b*, for example, by screw bolts that project from the fixed guard plate part 13 toward the adjustment ring 12 and support it when the adjustment ring 12 is pressed away from the winding space 6 against the pretensioning force of the pretensioning device 17. By screwing said screw bolts or axially adjusting the adjustment path limiters 16*b* so that they extend more or less far from the fixed guard plate part 13, the position of the adjustment ring 12, or more precisely its maximum retraction position away from the winding space 6, can be specified.

Figures 4, 5, 8, 9:
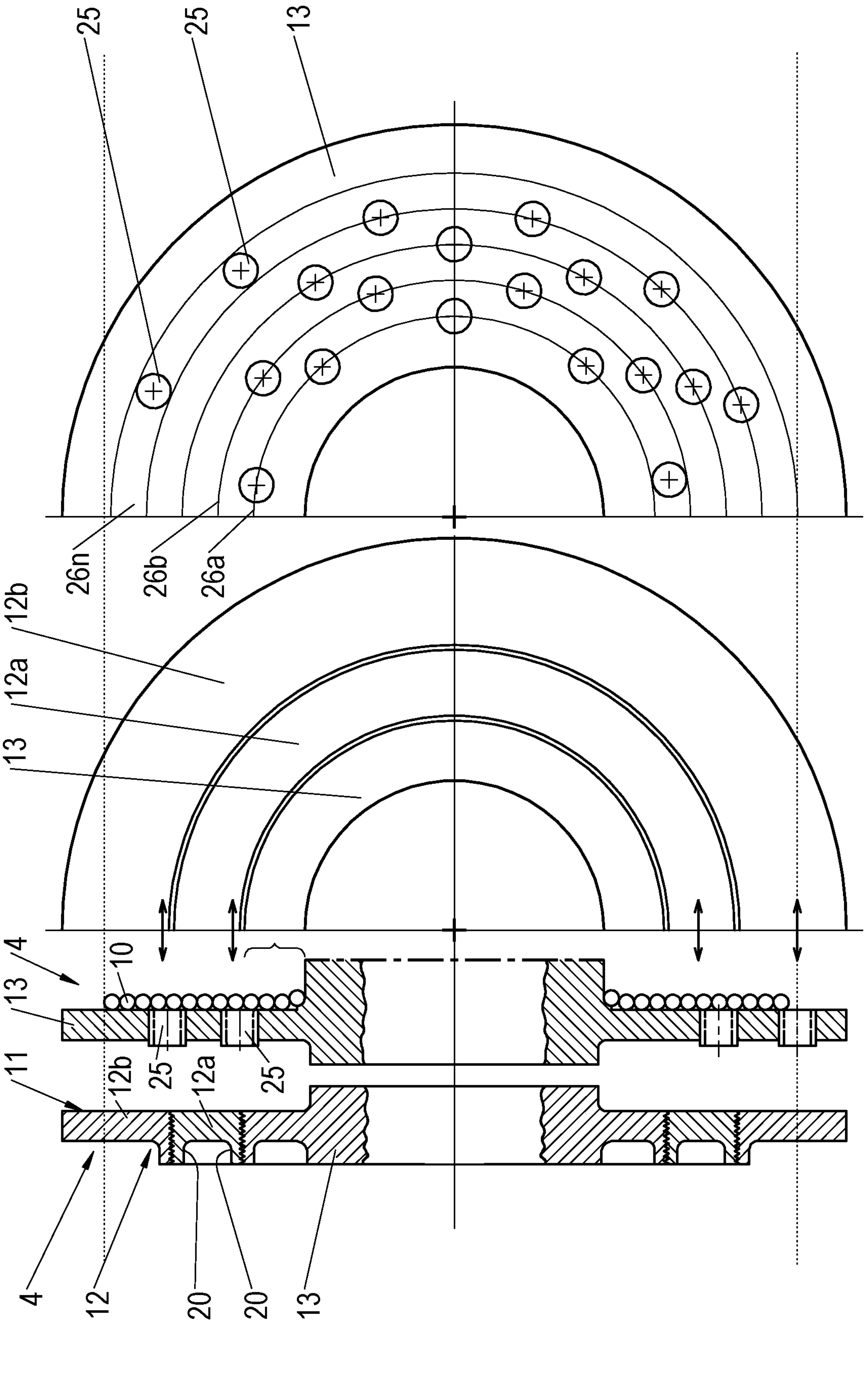
FIG. 4 shows longitudinal section through the guard plate of the cable drum of FIG. 1 according to a further embodiment of the invention, according to which the guard plate has as adjustable inner wall parts several adjustment rings which are screwed together at their parting lines in order to achieve an axial adjustment by twisting the adjustment rings.
FIG. 5 shows a half plan view of the guard plate of FIG. 4, showing the adjustment rings seated against each other.
FIG. 8 shows a longitudinal sectional view of a guard plate of the cable drum of FIG. 1 according to a further embodiment of the invention, according to which several axially adjustable push elements are provided in the guard plate.
FIG. 9 shows a half plan view of the guard plate of FIG. 1, showing the distribution of the push pads on the guard plate.

As FIGS. 4 to 7 show, one or each guard plate 4 can also have several axially adjustable inner wall parts 11, for example in the form of several adjusting rings 12, which can be arranged concentrically to one another and together form the rope contact surface of the guard plate 3, cf. FIG. 4.

In particular, several adjustment rings 12 with different ring diameters can be provided, wherein the smallest or an innermost adjustment ring can be seated on a fixed guard plate part 13, which can be rigidly connected to the drum body 3.

Said adjustment rings 12*a* and 12*b* can be seated one inside the other, whereby in turn the fixed guard plate part 13 can be seated in the innermost adjusting ring 12*a*, wherein at least in one axial position the adjustment rings 12*a* and 12*b* and the fixed guard plate part 13 can form a substantially smooth, in particular flat, cable contact surface.

The adjustment rings 12 may be connected to each other by a screw thread 20 in the parting line between the adjacent adjustment rings 12, or may be connected to said fixed guard plate part 13 by a screw thread 20 in the parting line between the fixed guard plate part 13 and the innermost adjustment ring 12*a*, so that the adjustment rings 12 are axially adjustable by twisting. If, for example, the innermost adjustment ring 12*a* is rotated, the innermost adjustment ring 12*a* and, together with it, the further outer adjustment rings 12*b* undergo an axial adjustment relative to the stationary guard plate part 13. If, on the other hand, the outer adjustment ring 12*b* is rotated relative to the inner adjustment ring 12*a*, the outer adjustment ring 12*b* adjusts axially, i.e. parallel to the longitudinal axis 5 of the drum body 3.

As FIG. 2 shows in conjunction with FIG. 8 and the winding layers shown there, each adjusting ring 12 can extend in the radial direction over a height corresponding to several cable diameters. In other words, each adjustment ring 12 can form the cable contact surface for several winding layers, for example for three to five winding layers. Regardless thereof, the fixed guard plate part 13 can also have a height corresponding to several cable diameters, so that a contact surface for several winding layers is provided on the fixed guard plate part 13, cf. comparative FIGS. 4 and 8.

In order to be able to fix the adjustment rings 12*a* and 12*b* in a certain screwed position and thus axial position, the screw threads 20 can be pretensioned. In particular, a clamping device 21 can be provided by means of which the adjustment rings 12*a* and *b* can be clamped against each other and against the fixed guard plate part 13, respectively.

Advantageously, the adjustment ring 12 may include a clamping portion 22 on which a portion of the screw thread 20 is formed and which may include an undercut 23 extending into the screw thread 20. A clamping portion 24 can pass through said undercut 23 to clamp the screw thread portions located on either side of the undercut 23. Said clamping portion 24 may in particular be a screw bolt which can be screwed through the undercut 23 into the body of the adjustment ring 12, cf. FIGS. 6 and 7.

As shown in FIGS. 8 to 13, the guard plates 4 may also have a plurality of push elements 25, each forming an axially adjustable inner wall portion 11. As shown in particular in FIGS. 8 and 9, several groups of push elements 25 can each be arranged distributed on pitch circles 26*a* to *n* of different diameters in order to be able to apply different axial loads to different winding layers. The multiple push elements 25 distributed along a respective pitch circle 26 also make it possible to achieve different support ratios within a winding layer, especially in the run-up areas of the outermost cable winding, which winds onto the guard plate 4 at an acute angle and also unwinds from it at an acute angle.

For example, more than four or more than eight or more than twelve or even more than 20 push elements 25 can be arranged distributed on a pitch circle, wherein two, three, five or even ten pitch circles with pressure pieces can be provided.

As FIG. 8 shows, the push elements 25 can have a diameter corresponding to two or three or four or five times the cable diameter, so that one push element 25 forms a cable contact surface for two or three or four or five winding layers.

As FIGS. 10 to 13 illustrate, said push elements 25 can be axially adjusted by twisting or screwing and/or can be extended to different extents from the inner face of the fixed guard plate part 13 to project beyond the inner face of the guard plate part 13.

It should be clarified, however, that said push elements 25 can also be provided in self-adjustable guard plate parts, for example the previously described adjustment rings 12.

Figure 12:
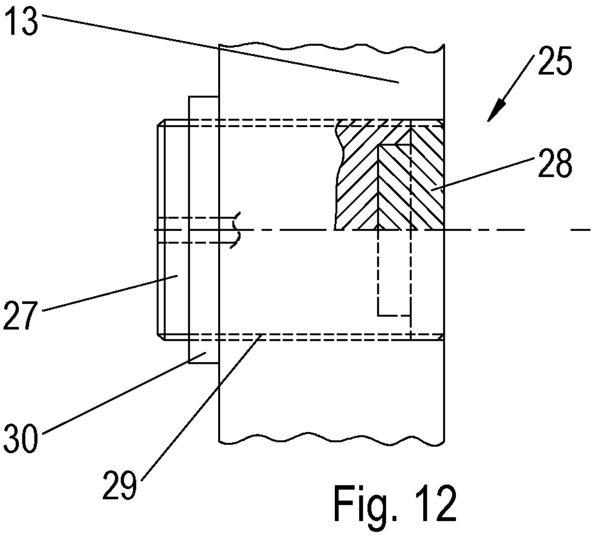
FIG. 12 shows a cross-sectional view of a push elements shown in FIGS. 8 and 9, showing the screw connection of the push elements to the fixed guard plate part, a separate push head, and a lock nut for securing the push element in a desired position.

In particular, the push elements 25 may each comprise a screw bolt 27 that is screwed into the guard plate part receiving the push elements 25. The respective screw bolt 27 can form a push head 28 with its end face itself, which forms a cable contact surface. Alternatively, the push head 28 can also be configured separately from the screw bolt 27 and, for example, be placed on the front side of the latter, as shown in FIG. 12. A separate design of the push head 28 makes it possible, the push head 28 can be attached to the screw bolt 27 independently thereof in a form-fit and/or force-fit manner or also in a material-fit manner.

Figure 11:
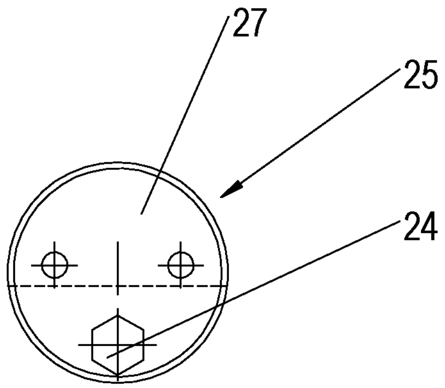
FIG. 11 shows a top view of the push element of FIG. 10, showing tool attachment contours for twisting the push element and the clamping device.
Figure 13:
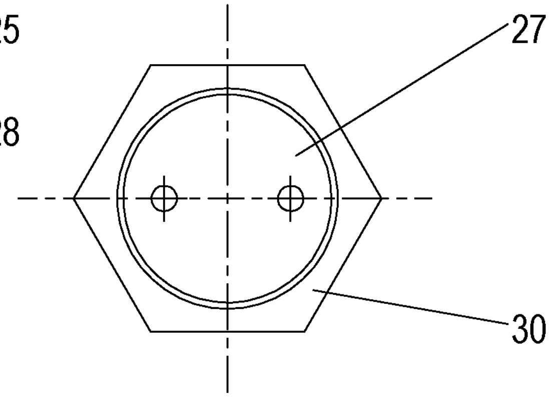
FIG. 13 shows a top view of the face of the push element on FIG. 12, showing the tool attachment contours for twisting the push element and the lock nut.
Figure 6:
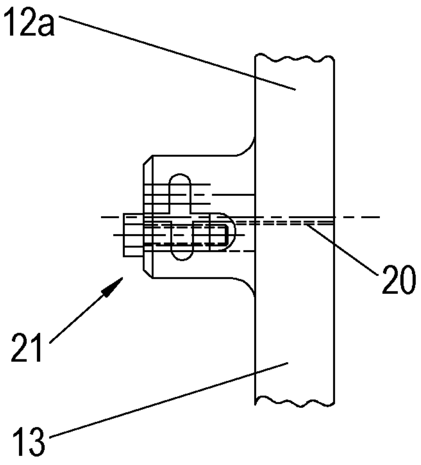
FIG. 6 shows a sectional, enlarged cross-sectional view of the seam between two adjustment rings and the clamping device for fixing the screw connection between the two adjustment rings.
Figure 7:
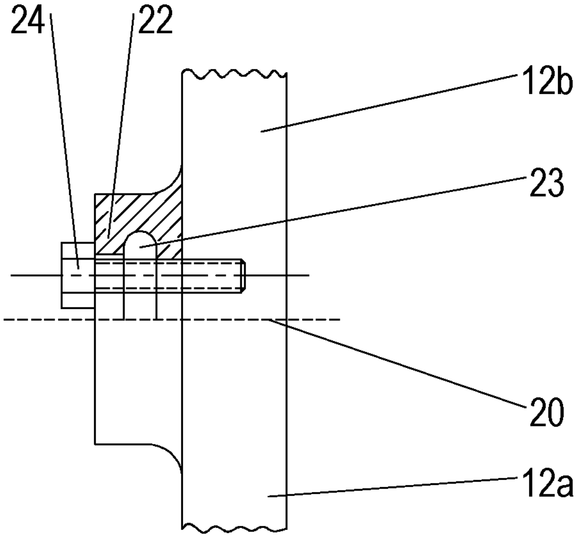
FIG. 7 shows a half-section view, enlarged again, of the seam between two adjustment rings, showing a screw bolt of the clamping device for clamping the screw connection.

As FIGS. 11 and 13 make clear, the screw bolt 27 can preferably have a tool contour 29 on its rear side, i.e. the end face facing away from the winding space 6, in order to be able to apply a turning or screwing tool.

In order to be able to freeze or fix the screw bolt 26 in a certain rotational position and thus the push element 25 in a certain axial position, the push elements 25 can have a clamping and/or fixing device.

Figure 10:
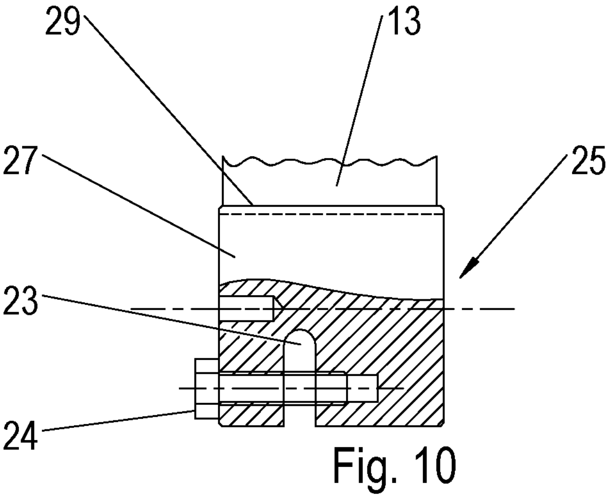
FIG. 10 shows a cross-sectional view of a push element shown in FIGS. 8 and 9, showing the bolting of the push element to a fixed guard plate part and the clamping device for clamping the bolting.

As FIG. 10 shows, for example, the screw thread 29 with which the push elements 25 can be screwed into the surrounding guard plate part 13 can be pretensioned or clamped. For this purpose, similar to that described in connection with FIGS. 6 and 7, an undercut 23 may be provided in the screw bolt 27 and interrupt the screw thread 29. By screwing in a clamping means, for example a clamping screw through the undercut 23, the screw thread 29 can be clamped.

Alternatively or additionally, a lock nut 30 can be used, which is screwed onto a protruding bolt portion and pretensioned against the surrounding guard plate part, see FIGS. 12 and 13.

We claim:

1. A cable drum for a cable winch of a cable drive comprising:

a drum body having face sides; and two guard plates surrounding the drum body on the face sides, wherein the two guard plates delimit a winding space therebetween, wherein at least one of the two guard plates has at least one inner wall part axially adjustable in the direction of a drum longitudinal axis such that the distance between the two guard plates is adjustable, wherein the at least one inner wall part comprises adjustment rings of different ring diameters, wherein the adjustment rings comprise cable contact surfaces for different winding positions.

2. The cable drum of claim 1, wherein at least one adjustment ring of the adjustment rings is mounted so as to be axially adjustable in a longitudinal direction of the drum relative to a fixed guard plate part and/or a drum part.

3. The cable drum of claim 2, wherein the at least one adjustment ring is axially displaceably mounted and elastically pretensioned inwardly towards the winding space by a pretensioning device.

4. The cable drum of claim 3, wherein the pretensioning device has at least one spring device between the at least one inner wall part and the fixed guard plate part.

5. The cable drum of claim 4, further comprising at least one adjustment path limiter for limiting elastic displaceability of the at least one inner wall part.

6. The cable drum of claim 5, wherein the at least one adjustment path limiter is adjustable so a length of the axial travel of the at least one inner wall part and/or an end position of the axial displaceability are adjustable.

7. The cable drum of claim 6, wherein the at least one adjustment path limiter has at least one screw bolt which predetermines different end positions in different screw positions.

8. The cable drum of claim 1, wherein the adjustment rings are seated within one another and are screwable relative to one another by a screw thread formed in a parting line formed between the adjustment rings and are axially adjustable.

9. The cable drum of claim 8, further comprising a clamping device for clamping and/or pretensioning the adjustment rings relative to one another, wherein the clamping device comprises the screw thread between the adjustment rings and/or between an adjustment ring and a fixed guard plate part.

10. A cable winch comprising the cable drum of claim 1.

11. A cable drive comprising a cable and the cable winch of claim 10.

12. A cable drum for a cable winch of a cable drive comprising:

a drum body having face sides;

two guard plates surrounding the drum body on the face sides, wherein the two guard plates delimit a winding space therebetween, wherein at least one of the two guard plates has at least one inner wall part axially adjustable in the direction of a drum longitudinal axis such that the distance between the two guard plates is adjustable; and an innermost and/or smallest adjustment ring screwable relative to a fixed guard plate part by a screw thread formed in a parting line between the innermost and/or smallest adjustment ring and the fixed guard plate part, and is axially adjustable.

13. A cable drum for a cable winch of a cable drive comprising:

a drum body having face sides; and two guard plates surrounding the drum body on the face sides, wherein the two guard plates delimit a winding space therebetween, wherein at least one of the two guard plates has at least one inner wall part axially adjustable in the direction of a drum longitudinal axis such that the distance between the two guard plates is adjustable, wherein the at least one inner wall part comprises push elements on at least one pitch circle distributed circumferentially about the drum longitudinal axis.

14. The cable drum of claim 13, wherein the at least one inner wall part comprises adjustment rings of different ring diameters, wherein the adjustment rings comprise cable contact surfaces for different winding positions.

15. The cable drum of claim 13, further comprising more than five of the push elements.

16. The cable drum of claim 13, wherein the push elements are on pitch circles of different pitch circle diameters, each distributed in the circumferential direction, wherein at least four of the push elements are on each pitch circle.

17. The cable drum of claim 13, wherein the push elements are axially adjustable individually and/or independently of each other.

18. The cable drum of claim 13, wherein the push elements each comprise a screw bolt screwed into a guard plate part surrounding the respective push element, and wherein each push element carries a push head, wherein the push head is axially adjustable by screwing the screw bolt and can be adjusted to project to different extents beyond an inner wall of surrounding guard plate parts, and wherein the push head comprises a cable contact surface.

19. The cable drum of claim 18, wherein the push head is integrally formed in one piece on an end face of the screw bolt.

20. The cable drum of claim 18, wherein the push head is formed separately from the screw bolt and comprises a softer material than the screw bolt.

21. A cable drum for a cable winch of a cable drive comprising:

a drum body having face sides; and two guard plates surrounding the drum body on the face sides, wherein the two guard plates delimit a winding space therebetween, wherein at least one of the two guard plates has at least one inner wall part axially adjustable in the direction of a drum longitudinal axis such that the distance between the two guard plates is adjustable, wherein a clamping and/or a holding device for fixing push elements in a desired axial position is associated with the push elements.

* * * * *